United States Patent [19]

Coutinho et al.

[11] Patent Number: 5,966,166

[45] Date of Patent: Oct. 12, 1999

[54] SYSTEM AND METHOD FOR COMPRESSING VIDEO DATA FOR VIDEO CONFERENCING AT A REDUCED FRAME RATE

[75] Inventors: Roy S. Coutinho, Carmel, Ind.; James E. Dail, Marlboro, N.J.; Robert A. Pitsch, Indianapolis, Ind.

[73] Assignee: AT&T Corp, New York, N.Y.

[21] Appl. No.: 08/695,454

[22] Filed: Nov. 7, 1996

[51] Int. Cl.[6] ....................................... H04N 7/12
[52] U.S. Cl. .................. 348/15; 348/17; 348/439
[58] Field of Search .................... 348/423, 424, 348/439, 459, 384–389, 12–19; 386/110, 111; 370/503, 537; H04N 7/12

[56] References Cited

U.S. PATENT DOCUMENTS

| | | | |
|---|---|---|---|
| 5,136,618 | 8/1992 | Wright, Jr. | 375/122 |
| 5,313,281 | 5/1994 | Richards | 348/443 |
| 5,577,066 | 11/1996 | Schuchman et al. | 375/222 |
| 5,600,376 | 2/1997 | Casavant et al. | 348/423 |
| 5,627,825 | 5/1997 | Barraclough et al. | 370/260 |
| 5,767,895 | 6/1998 | Yashiro et al. | 348/12 |

*Primary Examiner*—Nathan Flynn

[57] ABSTRACT

The compression of composite video data is provided in order to reduce bandwidth and thereby increase the amount of bandwidth available for transmission. Composite video signals that include a plurality of fields are received at a selected clock frequency. A first selected number of fields is stored and a second selected number of fields is dropped. In a Frequency Division Multiplexing mode, the data is read out at a fraction of the selected clock frequency corresponding to the stored portion. In a Time Division Multiplexing mode, the data is read out at the selected clock frequency during selected intervals having a duration corresponding to the time it took to receive the stored fields. No data is read out during an interval having a duration equal to the time it took to scan the dropped fields, such time being allocated to the compressed information from other users of the same shared transmission medium.

19 Claims, 11 Drawing Sheets

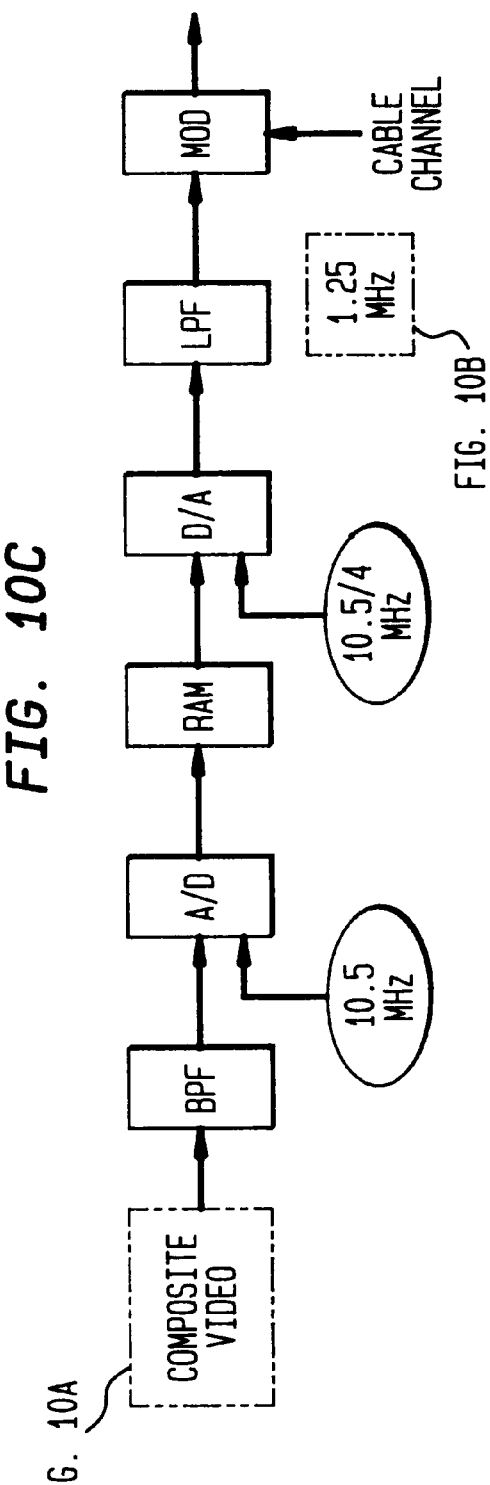
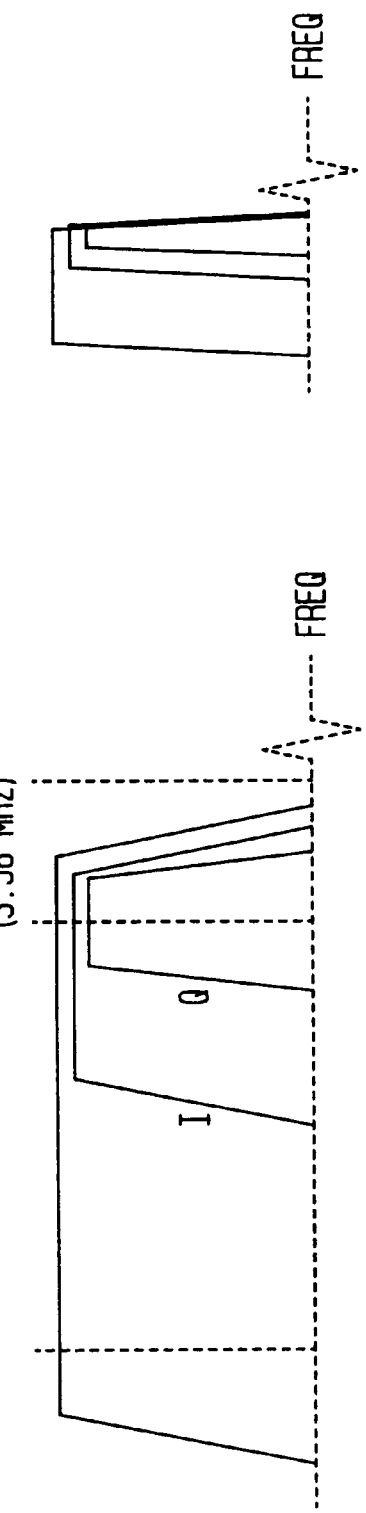

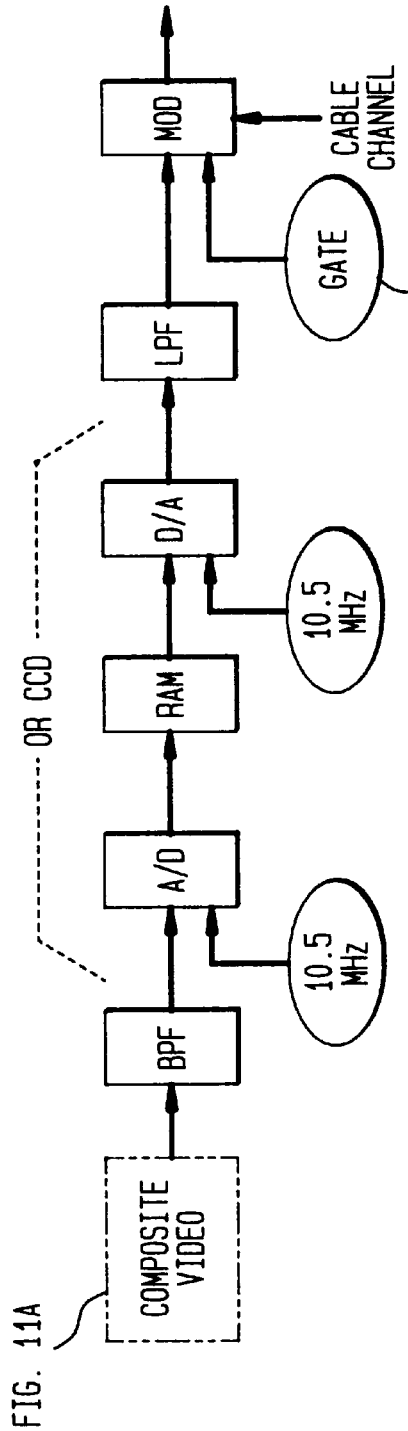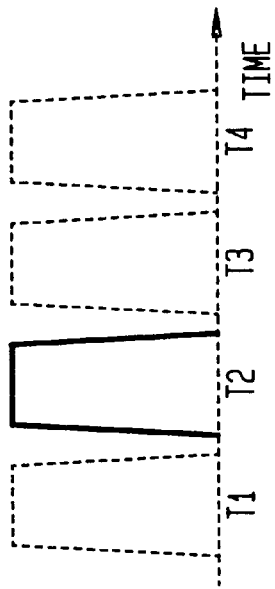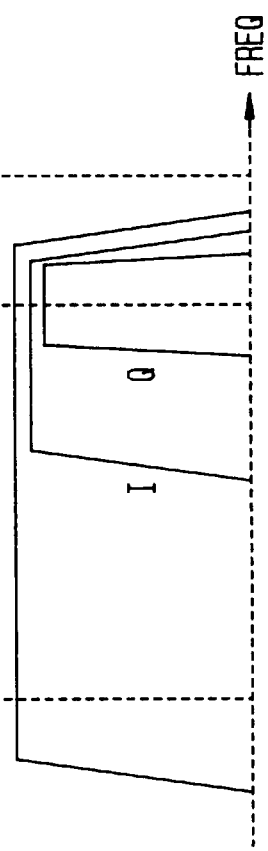

SYSTEM AND METHOD FOR COMPRESSING VIDEO DATA FOR VIDEO CONFERENCING AT A REDUCED FRAME RATE

BACKGROUND OF THE INVENTION

1. Field of the Invention

The invention relates to a system and technique for compressing video data in order to minimize the required bandwidth for transmission.

2. Background of Related Art

In recent years, various systems have become available for compressing NTSC video. Such systems aim to decrease required storage space and increase bandwidth available for transmission of data.

VCRs employ a standard technique in which a heterodyne process is used to process chrominance information. However, this technique, known as component sampling, has the disadvantage of requiring the separation of video information into luminance and chrominance. This technique also causes substantial degradation of signal quality because it requires reconstruction of the composite signal after it has been separated into components.

Bidirectional cable systems, useful for such applications as video telephony, have an increased need for compressing data to create available bandwidth. The cables extend from a head end to a fiber node. The fiber node converts optical signals to electrical signals and transmits via coaxial cable, the video signals to various locations in the community. Signals sent over the cables are NTSC signals that include video, color, sound, and synchronization. Available bandwidth limits the amount of audio and video information that can be transmitted. Therefore, because of increased usage of the cable systems, it is desirable to compress signals in order to increase the amount of available bandwidth.

Typically, systems have been designed to avoid the problems associated with limited available bandwidth. For example, many systems are point to point connecting individual classrooms in a campus environment, or video teleconference rooms in a corporate environment. Thus, in these systems users in off-site locations cannot be served.

Yet other systems provide local video telephone service to only a small group of users. For example, U.S. Pat. No. 4,847,829 discloses a system in which analog video terminals are connected to a centrally located analog video switch via dedicated coaxial cables in a star configuration. The number of users is limited by the capacity of the video switch. This approach is not economical for serving a mass consumer market because each video terminal requires a dedicated coaxial cable to access the video switch.

U.S. Pat. No. 4,901,367 discloses a coaxial cable network operating at 800 megahertz that is shared by 60 users, each of which is assigned a dedicated 12 megahertz bandwidth. However, given the assigned bandwidths, this number of users is the upper limit for the application.

U.S. Pat. No. 5,489,947 discloses a digital video signal processing system that receives encoded packets of data representing video image information in compressed form. The video image groups are organized in a compressed component format, (e.g., Y,U,V in the ratio 4:2:2) related to the video image compression format in which pairs of color-related components correspond to more than one pixel. In this and similar methods, the system must discern identical pixel content.

U.S. Pat. No. 5,148,292 discloses a video data processing apparatus in which data compression is performed by dividing a picture image into a predetermined number of blocks of pixels. Video data in each block of pixels are compressed by predetermined processing to reduce the amount of video data that needs to be stored in memory. The processing determines if plural blocks consist of the same pixel data, and if so, the pixel data for only one block are stored.

The aforementioned systems and methods are limited in the amount of bandwidth reduction that can be achieved, or in the complexity of the compression devices. Accordingly, there is a need for a system that can sufficiently reduce bandwidth in order to accommodate a large group of users.

SUMMARY OF THE INVENTION

An object of the invention is to provide a system and method for compressing video data in order to reduce the required frequency bandwidth for transmission.

A further object is to advantageously utilize the redundancy present in video signals. The system and method of the present invention are useful for situations in which relatively little motion is reflected in the video signals and for networks in which the signals are already compressed, so that no additional information will be lost.

Another object of the invention is to reduce noise. A smaller signal bandwidth is less likely to include discrete interferers.

A further object of the invention is to process a composite video signal without separating the signal into components.

The embodiments of the invention utilize a field dropping procedure in which a first selected number (N) of fields is saved in a memory and a second selected number (P) of fields is dropped.

In one embodiment of the invention, one out of every two fields is stored, and in another embodiment one out of every four fields is stored. The other fields are dropped. It is also possible to use an odd ratio such as one out of every three fields is saved. However, when using an odd ratio, additional processing is used to compensate for artifacts.

The video data compression technique of the present invention may be accomplished either with digital or analog data. Additionally, the technique may be carried out according to a frequency division multiplexing (FDM) mode or a time division multiplexing (TDM) mode.

In the digital embodiments, analog data is converted into digital data before being stored in the data retention device at a selected clock frequency. In the analog embodiments, the data retention device and the converters are replaced by an analog charge coupled device (CCD).

In the FDM mode, video data is transferred at a frequency equal to the original frequency at which the signals were recorded and multiplied by the first number (N) divided by the sum of the first and second numbers (N+P). In the TDM mode, the data is read out of storage at the same frequency at which it was received. However, the data is transmitted only during intervals having a selected duration based on the ratio of frames stored to the sum of frames dropped and stored.

The system can be implemented within a cable TV network including a head end and a fiber node for converting optical to electrical signals. Each subscriber receives the signals from the fiber node. Images are recorded by subscribers and the system receives the recorded frames of video signals at a selected clock frequency. A data retention device then stores a first number of fields (N) as video data and drops a second number of fields (P) in accordance with a predetermined ratio of the first number to the sum of the first and second numbers (N+P). In the FDM mode, the video data is then transferred from storage at a predetermined rate that is equal to the selected rate multiplied by the predetermined ratio. Alternatively, in the TDM mode the video data is transmitted at the selected clock frequency, but only during intervals of predetermined duration.

At a receiving end, in the FDM mode, the data is received at the reduced rate, but is played back at the selected rate. Each field is played N+P times. In the TDM mode, the data is transmitted to the receiver by a given transmitter only during transmitting intervals. The data is stored and each field is read out of storage N+P times at the selected rate.

BRIEF DESCRIPTION OF THE DRAWINGS

The invention will be described in detail with reference to the following drawings in which like reference numerals refer to like elements and wherein:

FIG. 10($a$) illustrates the standard NTSC signal,

FIG. 10($b$) illustrates the compressed video signal, and

FIG. 10($c$) shows a preferred embodiment of the FDM mode of the invention; and

FIG. 11($a$) illustrates a standard signal,

FIG. 11($b$) illustrates transmission and non-transmission intervals and

FIG. 11($c$) illustrates a preferred embodiment of the TDM mode of the invention.

DETAILED DESCRIPTION OF PREFERRED EMBODIMENTS

Preferred embodiments of the present invention are described hereafter with reference to the accompanying drawings.

In general, NTSC video is captured on a field by field basis. Each embodiment of the invention compresses the NTSC video by a given ratio. In a 4:1 compression ratio compressor, only one out of four consecutive fields is captured and stored. The NTSC field is captured through a sampling clock derived from the same NTSC source. The sampling clock may be obtained from the color-burst portion of the NTSC signal and its color-subcarrier frequency is tripled by a phase locked loop (PLL) circuit. The captured NTSC field is placed into a data retention device. The manner of reading out the data is dependent upon whether the time division multiplexing mode or the frequency division multiplexing mode is used. After the data is read out, it is transmitted onto a wide band network.

After traveling over the network, the data reaches a decompressor. At the decompressor, the data is stored in an additional memory prior to transmission to its destination. Data is read out at four times the storage rate with each field being repeated four times to recover a standard NTSC signal.

Although the aforementioned illustration specifies a 4:1 compression ratio, any ratio can be used. However, additional features may be necessary to maintain system integrity if an odd ratio such as 3:1 is used. This is due to the peculiarities of the NTSC signals and necessary phase reversals.

Figure 1:
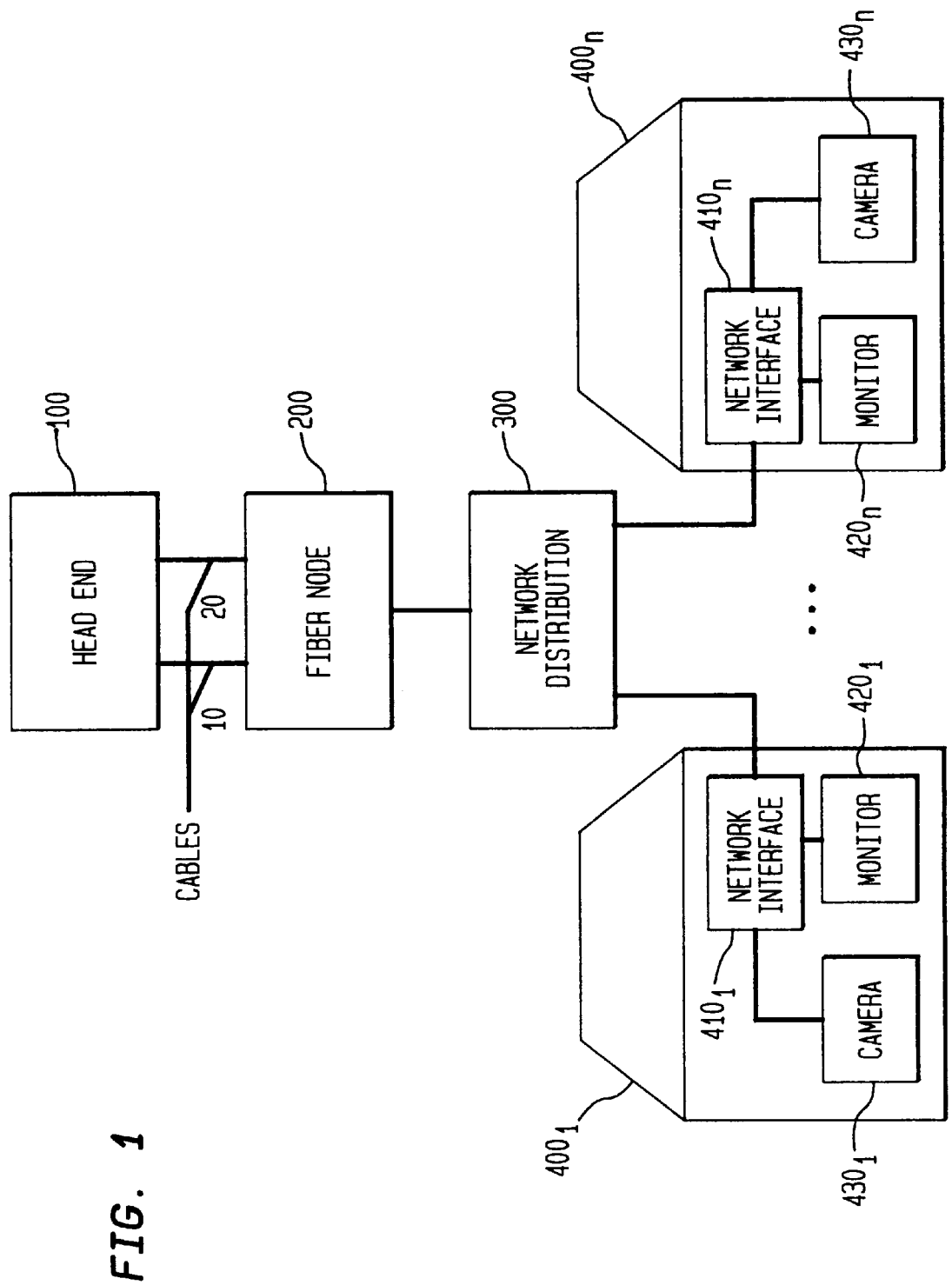
FIG. 1 is a block diagram illustrating a cable system on which the present invention can be utilized.

FIG. 1 illustrates a conventional cable system on which the system and method of the present invention can be practiced. Signals originate at head end 100 and are bidirectionally transmitted via cables 10 and 20. Upon reaching fiber node 200, the signals are transformed from optical to electrical signals and sent through cable distribution network 300. In the other direction, signals from subscribers $400_1$ to $400_n$ are transformed from electrical to optical signals. The signals are distributed in the community through cable distribution network 300 to subscribers $400_1$–$400_n$. Each subscriber has a camera 430 for recording video images, a monitor 420 for replaying video images, and a network interface unit 410 for interfacing with the cable distribution network. The cable network is merely an exemplary system in which the invention may be used. Other systems that could use the invention include twisted pair systems and satellite systems.

Four embodiments of the invention are described in detail below. These embodiments are: A) digital video compression in FDM mode; B) digital video compression in TDM mode; C) analog video compression in FDM mode; and D) analog video compression in TDM mode.

A. Digital Video Compression in FDM Mode

Figure 2:
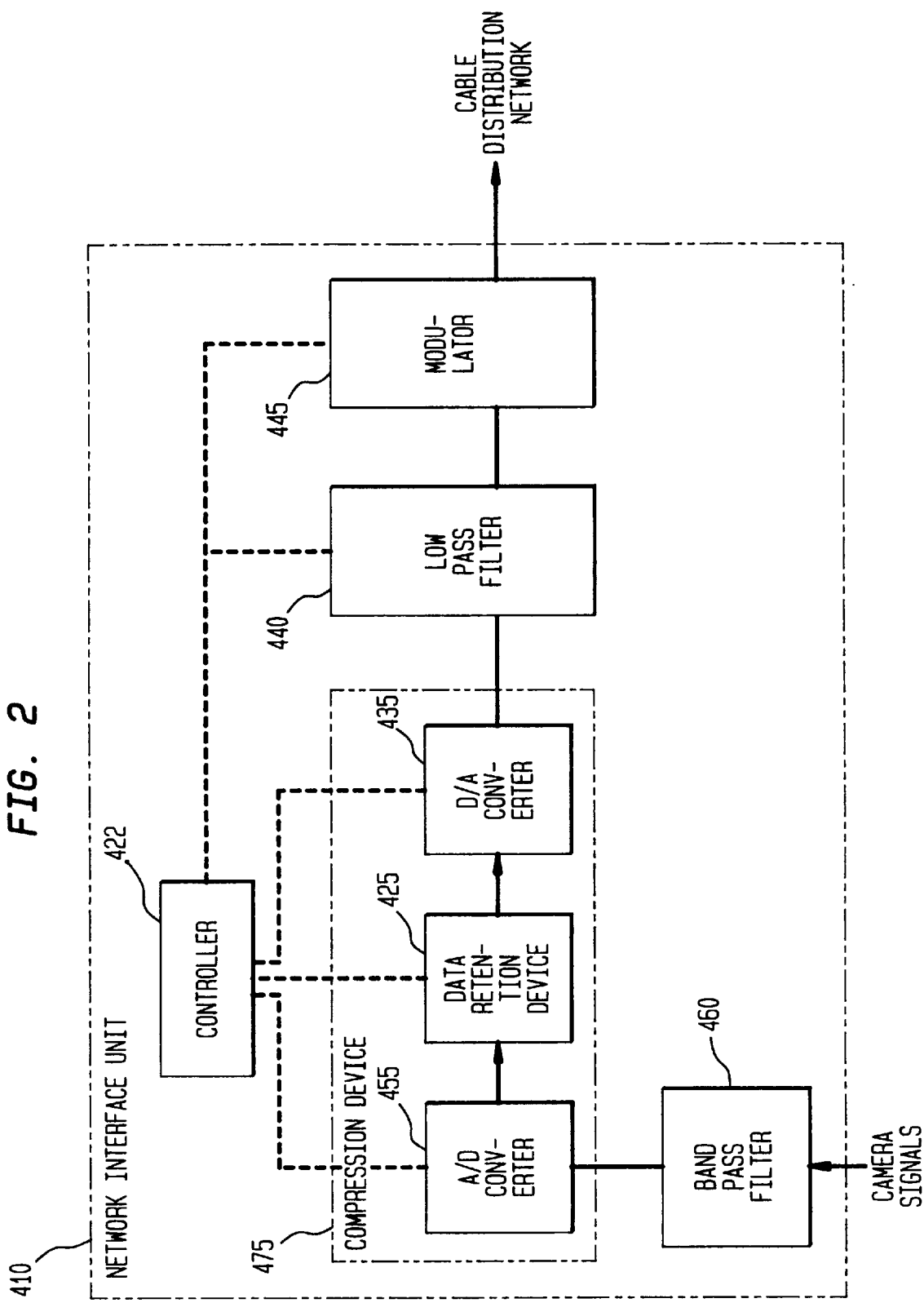
FIG. 2 is a block diagram illustrating a digital embodiment of the network interface unit.

FIG. 2 is a block diagram illustrating a network interface unit of a first embodiment of the invention. Composite video from camera 430 is sent through band pass filter 460. Selected frequencies are then sent to analog to digital (A/D) converter 455 at a selected clock frequency. From the A/D converter, only a selected portion of the data is saved in data retention device 425. Specifically, a first selected number of fields (N) is stored and a second selected number of fields (P) is dropped. Only the first selected number of fields is saved in data retention device 425 at a rate suitable to capture the full analog video signal. These saved fields are sent at a lower rate to digital to analog converter 435. The converters and data retention device form compression device 475. In the FDM embodiments, the information is transmitted with a bandwidth related to the bandwidth of the input video signal by a predetermined ratio of the first number to the sum of the first and second numbers. In the TDM embodiments described below, these signals are time division multiplexed to be transmitted at full bandwidth, but only at specific intervals related to the predetermined ratio. Subsequently, the signals then pass through low pass filter 440 and modulator 445 and are directed to receiving device or head end 100.

In the embodiments of the invention, the controller 422 can be implemented as a single special purpose integrated circuit (e.g., ASIC) having a main or central processor section for overall, system-level control, and separate circuits dedicated to performing various different specific computations, functions and other processes under control of the central processor section. It will be appreciated by those skilled in the art that the controller 422 can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer; e.g., a microprocessor; microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 6–9 can be used as the controller.

Although compression is disclosed generally within a network interface unit (NIU) or customer premise equipment (CPE), the compression process may also occur elsewhere within the cable system. In this instance, all fields of the video signal are transmitted to the compressor from the location of the recording device.

Figure 3:
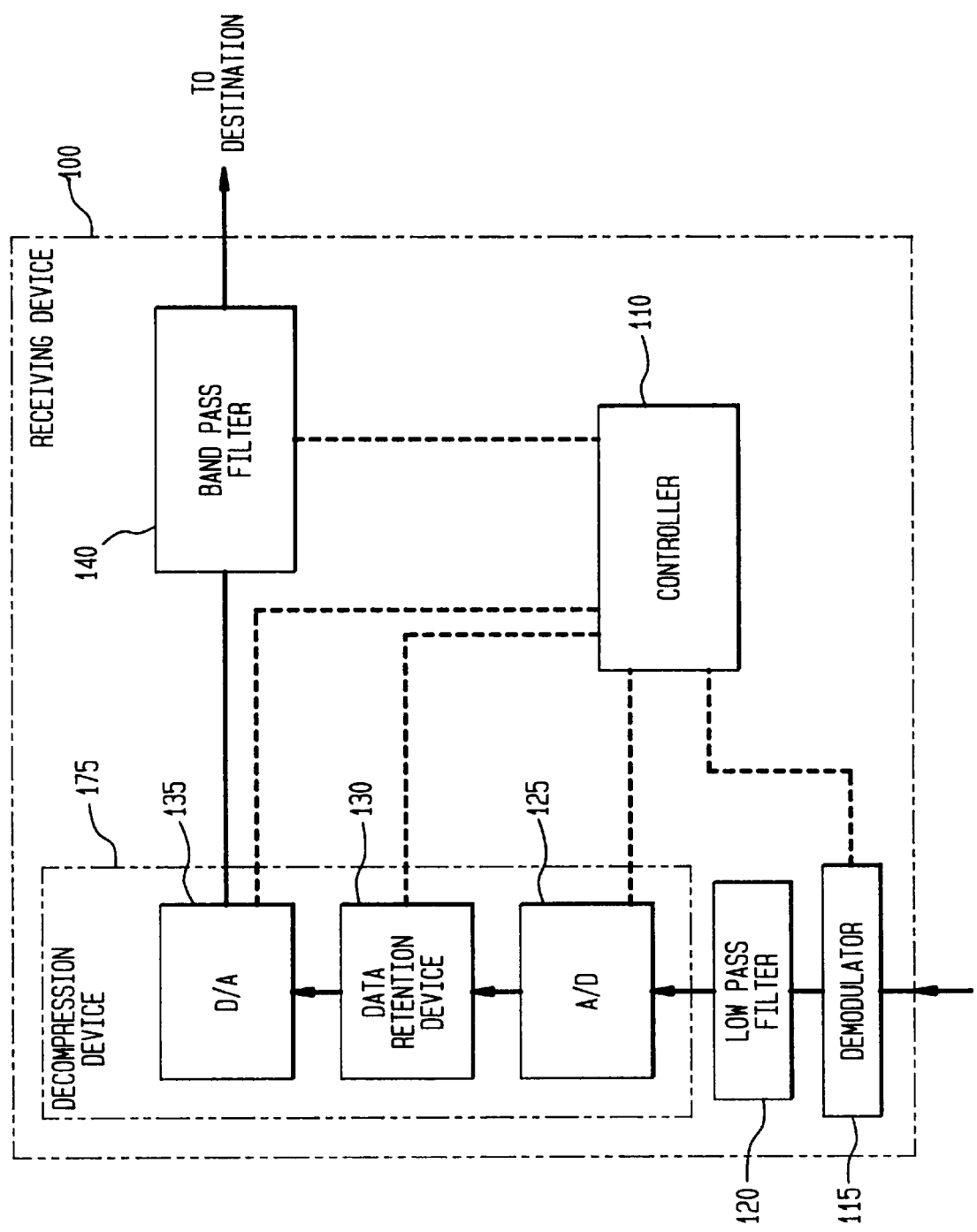
FIG. 3 is a block diagram illustrating a digital embodiment of the receiving device.

FIG. 3 illustrates a receiving device or head end 100 for the embodiment of FIG. 2. Signals are received at demodulator 115 and sent through low pass filter 120. The analog signals are converted to digital signals at A/D converter 125. The signals transmitted to A/D converter 125 are transmitted at the selected clock speed multiplied by the predetermined ratio in the FDM mode. In a first preferred embodiment, data retention device 130 is a random access memory (RAM). Alternatively, in another preferred embodiment, the data retention device can be a first in-first out (FIFO) memory or any other storage device capable of performing these steps illustrated in the flowcharts of FIGS. 6–9.

Digital to analog converter 135 receives the signals from data retention device 130 at the selected clock speed. Subsequently, these signals are sent through band pass filter 140 to their ultimate subscriber destination. The converters 125, 135 and data retention device 130 form decompressor device 175. Controller 110 may be any of the devices disclosed above in conjunction with FIG. 2. Controller 110 controls the interaction of the above-mentioned components.

The receiving device or head end 100 of FIG. 3 may be implemented in either a centralized device such as a head end of the cable system or at a subscriber's receiving terminal in the NIU or CPE.

Figure 6:
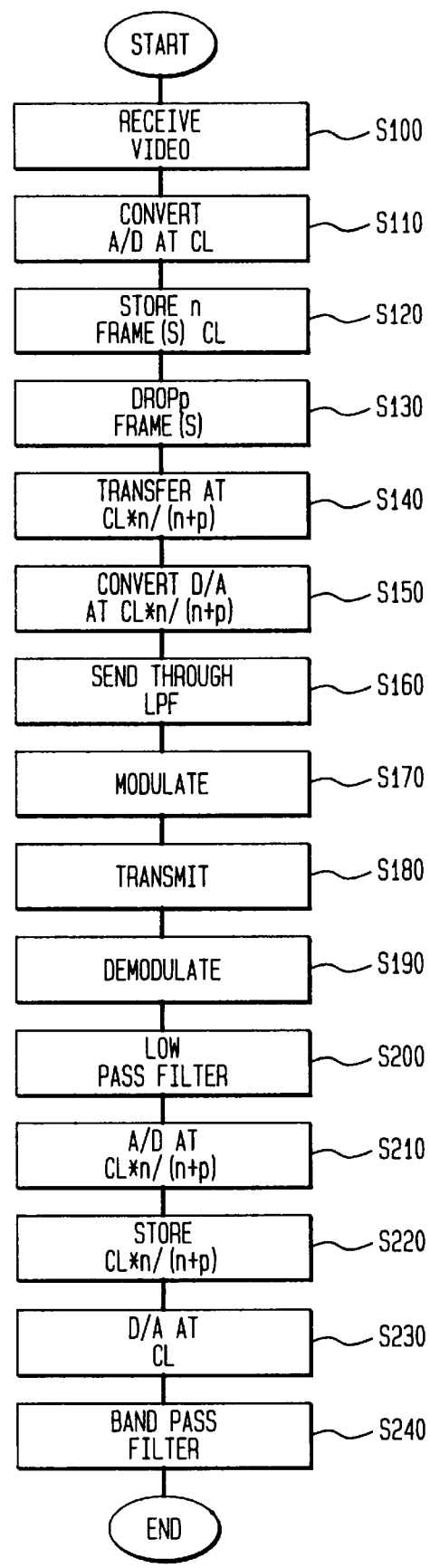
FIG. 6 is a flowchart illustrating the method for a first embodiment of the invention.

FIG. 6 is a flowchart illustrating the steps in the digital FDM embodiment. At S100 band pass filter 460 receives the composite video signals. The signals are then forwarded to A/D converter 455 and converted from analog to digital format at S110. At S120 a selected number N (N≧1) of fields is stored at a selected clock frequency in data retention device 425. At S130, a selected number P (P≧1) of fields is dropped. At S140, the data retained in retention device 425 is transferred to digital to analog converter 435 at a frequency equivalent to the selected clock frequency times the ratio of the first selected number (N) to the sum of the first and second selected numbers (N+P). At S150, the signals are converted from digital to analog and subsequently transmitted to low pass filter 440 at S160 and are modulated at S170. In S180, the signals are transmitted to receiving device or head end 100. Receiving device or head end 100 demodulates the transmitted signals with demodulator 115 at S190. The signals are then forwarded to low pass filter 120 at S200 and selected frequencies are sent to analog to digital converter 125 at S210. At S220, the fields are stored in data retention device 130 at a rate of the selected clock frequency multiplied by the predetermined ratio of the first number (N) to the sum of the first and second number (N+P). The signals are read out at the selected (full) clock rate a number of times equal to the ratio of the first number (N) to the sum of the first and second numbers (N+P). The signals are transferred repetitively out of data retention device 130 to digital to analog converter 135 at the selected clock frequency. At S230, digital to analog conversion is accomplished by D/A converter 135. Signals are then forwarded to band pass filter 140 in S240 and are sent to the ultimate destination.

B. Digital Video Compression in TDM Mode

Digital video compression in TDM mode uses the identical block diagram to that used in FDM mode. Therefore, the description of the apparatus will be omitted.

Figure 8:
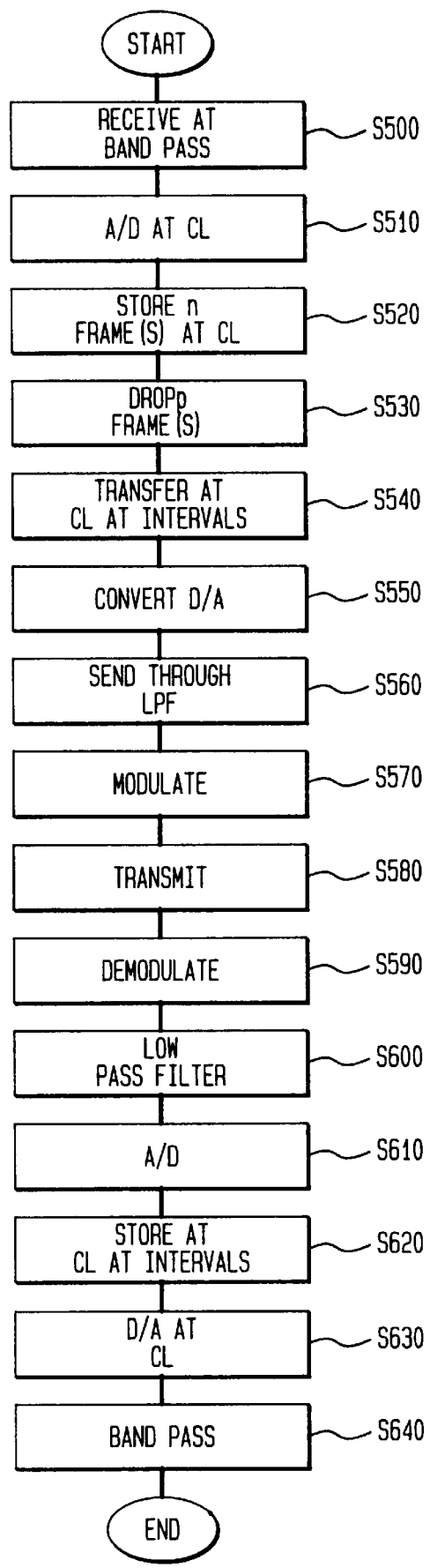
FIG. 8 is a flow chart illustrating the method of a third embodiment of the invention.

FIG. 8 illustrates the steps for accomplishing video compression in the digital embodiment in which time division multiplexing is used. In S500, composite video signals are sent through band pass filter 460 and selected frequencies are passed to analog to digital converter at a selected clock frequency in S510. In S520, a first selected number N (N≧1) of fields is stored in data retention device 425 and in S530, a second selected number P (P≧1) of fields is dropped. In S540, the stored fields are transferred from data retention device 425 to digital to analog converter 435. The fields are transmitted at the same clock frequency at which they were received. However, transmissions from a single user are relegated to a specified time slot which occupies a fraction of total time equal to the ratio of the first number (N) and the sum of the first and second number (N+P). Specifically, since only a fraction of the original data has been stored, only a fraction of the original time is needed to output the data. Therefore, data is transmitted for an interval equal to a time T that it took to transmit a number of fields N+P at the selected clock frequency multiplied by the predetermined ratio of N to N+P. Accordingly, data is not transmitted by this transmitter during the interval equal to T multiplied by P divided by N+P. In S550, the data is converted from digital to analog by D/A converter 435. Subsequently, in S560, selected frequencies are passed by low pass filter 440. In S570, the signals are modulated by modulator 445 and are sent to the cable distribution network or other type of network at S580.

Receiving device or head end 100 receives the signals at S590 with demodulator 115 and demodulates these signals. At S600, these signals are sent to low pass filter 120, and at S610 selected frequencies from one or more compressed sources are passed through to A/D converter 125. At the selected transmission interval for a particular source described above, at S620, the data is stored in data retention device 130 at the full clock rate. In S630, the data is continuously sent, also at the full clock rate, to D/A converter 135 a number of times equal to the ratio of the first number (N) and the sum of the first and second numbers (N+P). It is forwarded to band pass filter 140 through which the data is transmitted to its ultimate destination.

Referring to FIG. 3, in the decompression device 175, which is formed by the converters and retention device 130 in the receiver, special circuitry may be useful to remove a portion of the bandwidth reduced video field such that the speed-up version of the video is viewable by ordinary TVs and VCRs. Specifically, in NTSC video, there are four different color fields, A, B, C, and D. Although A and C are odd fields and B and D are even fields, A is different from C. Each adjacent field has a color phase difference of 270°. Accordingly, field A and C have a color phase difference of 180°. For every four fields, the color phase difference returns to zero. Accordingly, by capturing a single field such as field A, playing it back at one quarter normal speed, capturing it at the decompressor, and repeatedly playing back field A at normal speed four times, a pseudo NTSC signal that has the field sequence A-A-A-A is generated. Such a signal will not display color information on a consumer VCR or TV due to the color phase discontinuity between fields. Also, because the play out fields are all the same type (odd fields), the picture would smear at the top 15 to 25% of the TV screen.

Accordingly, a special technique can be implemented. Field A has 262.5 horizontal TV lines. The readout data retention device will only play out 262 lines. At the other half of the line, a pseudo vertical sync (V-SYNC) is electronically inserted into the output circuit. This arrangement extends the length of the V-SYNC but does not delay the vertical retrace timing due to the missing one-half line. This method effectively eliminates the 270° color phase discontinuity and modifies the signal into the non-interlace format which is displayable by consumer equipment.

The horizontal TV line is counted by the number of sampling clocks assisted by the horizontal sync (H-SYNC) pulse, but is not directly derived from the H-SYNC pulses. Such procedure is used to overcome the non-coherent signal source from a non 100% NTSC compliant video signal.

C. Analog Video Compression in FDM Mode

Figure 4:
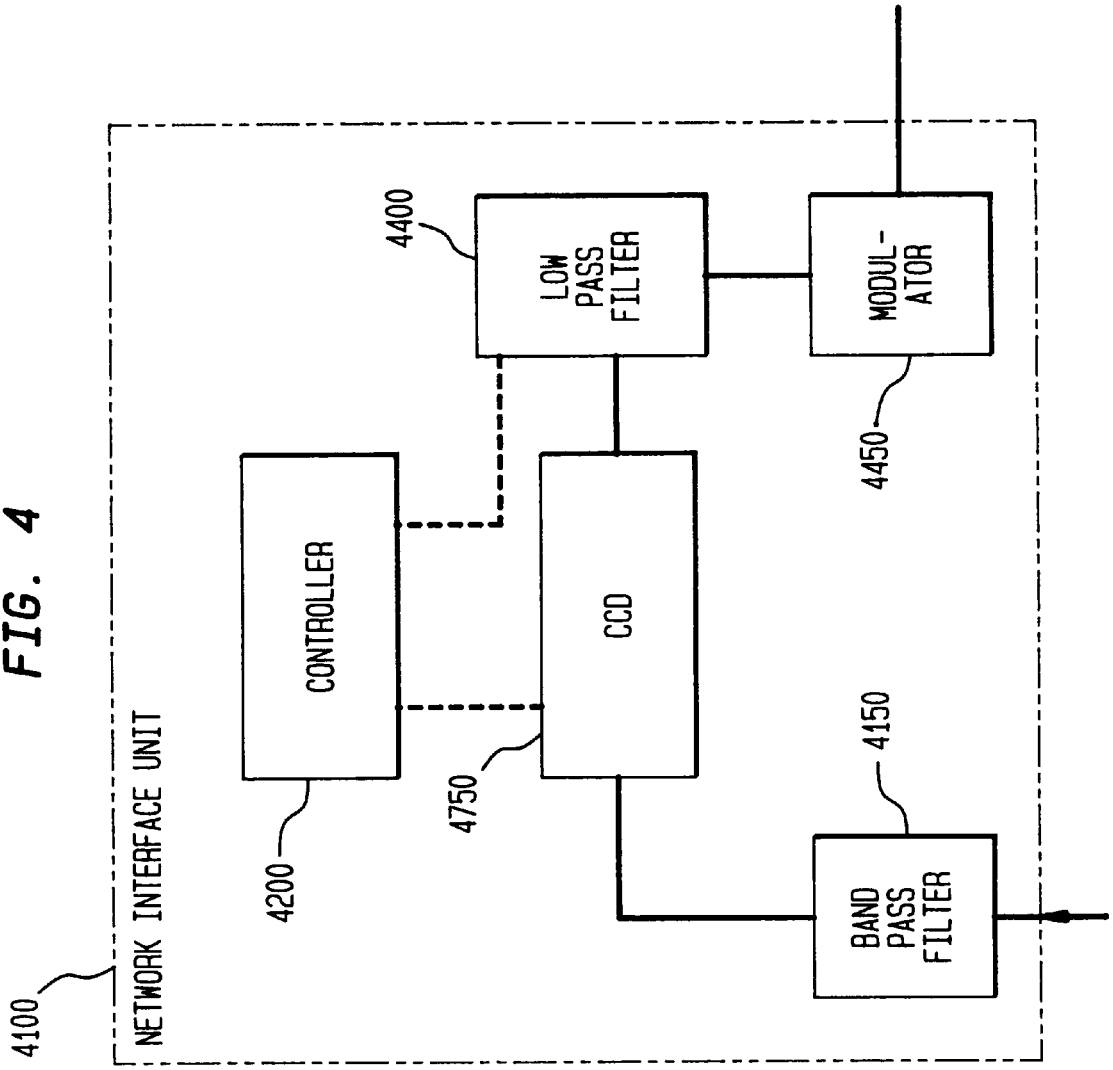
FIG. 4 is a block diagram illustrating an analog embodiment of the network interface unit.

FIG. 4 is a block diagram illustrating an embodiment of an alternative network interface unit 4100. The signals are received by band pass filter 4150 that passes selected frequencies to an analog charged couple device (CCD) 4750. Again, a first selected number of fields is stored as sequential analog samples at a full clock rate and a second selected number of fields is dropped. The ratio of the first selected number (N) to the sum of the first and second selected numbers (N+P) determines the rate of shifting the signals out of CCD 4750. The signals are shifted out of CCD 4750 at the lower rate to low pass filter 4400. Selected frequencies are passed by low pass filter 4400 and sent to modulator 4450. The modulator 4450 forwards the signals to a receiving device or head-end 100. The shifting of charges can be clocked internally at CCD 4750. Controller 4200 controls the aforementioned interaction between components. The controller 4200 can be any of the devices disclosed above in connection with FIG. 2.

Figure 5:
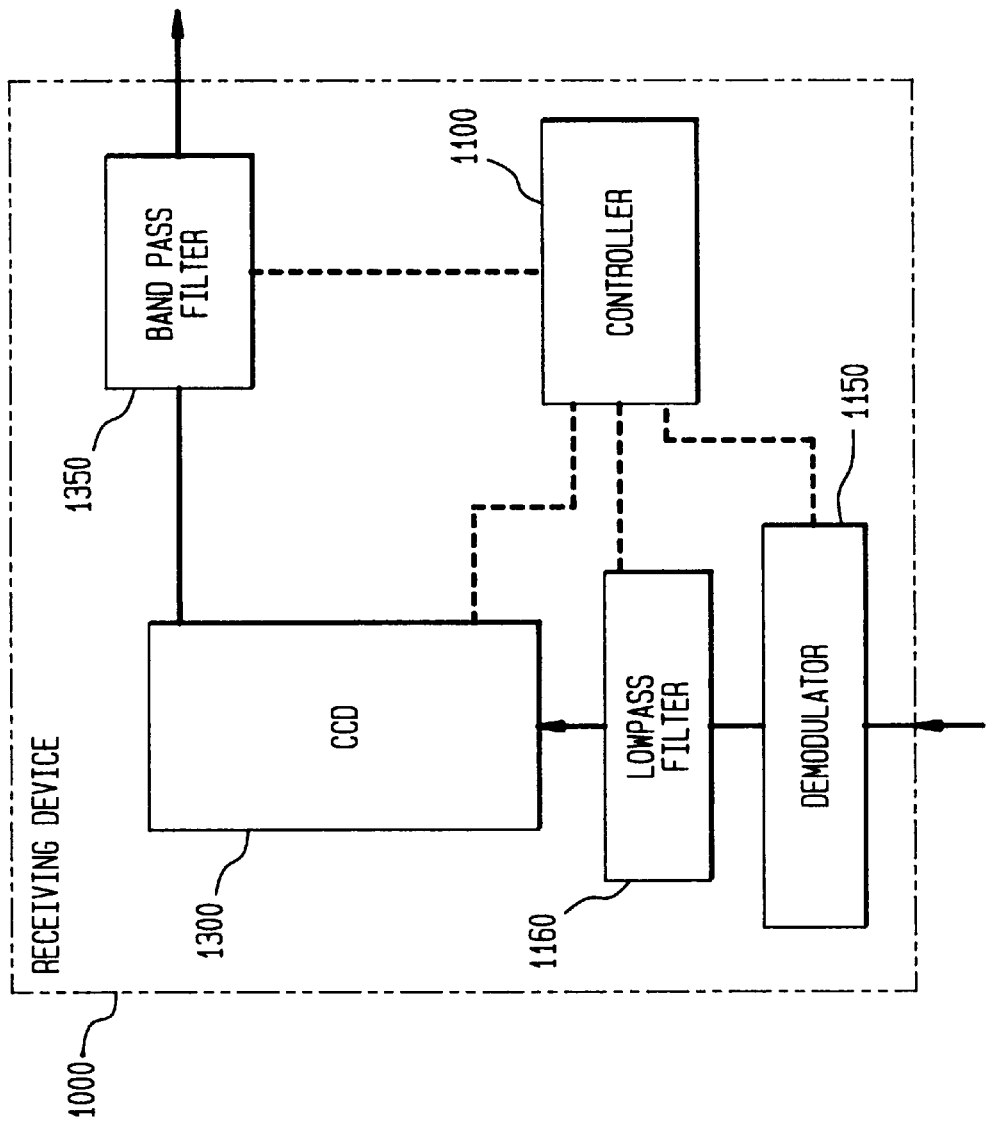
FIG. 5 is a block diagram illustrating an analog version of the receiving device.

FIG. 5 illustrates the receiving device 1000 for the embodiment of FIG. 4. Demodulator 1150 receives the signals transmitted by modulator 4450. From demodulator 1150, these signals are sent to low pass filter 1160. Selected frequencies are passed through the low pass filter 1160 to CCD 1300. Controller 1100 is substantially similar to the controller disclosed in connection with the previous embodiments.

Again, depending upon whether the signals are time division multiplexed or frequency division multiplexed, they are transferred into CCD 1300 in a specific manner as described previously for digital compression. Prior to transmission, the signals are sent through bandpass filter 1350. The signals are then transmitted to the subscriber at the selected frequency.

Figure 7:
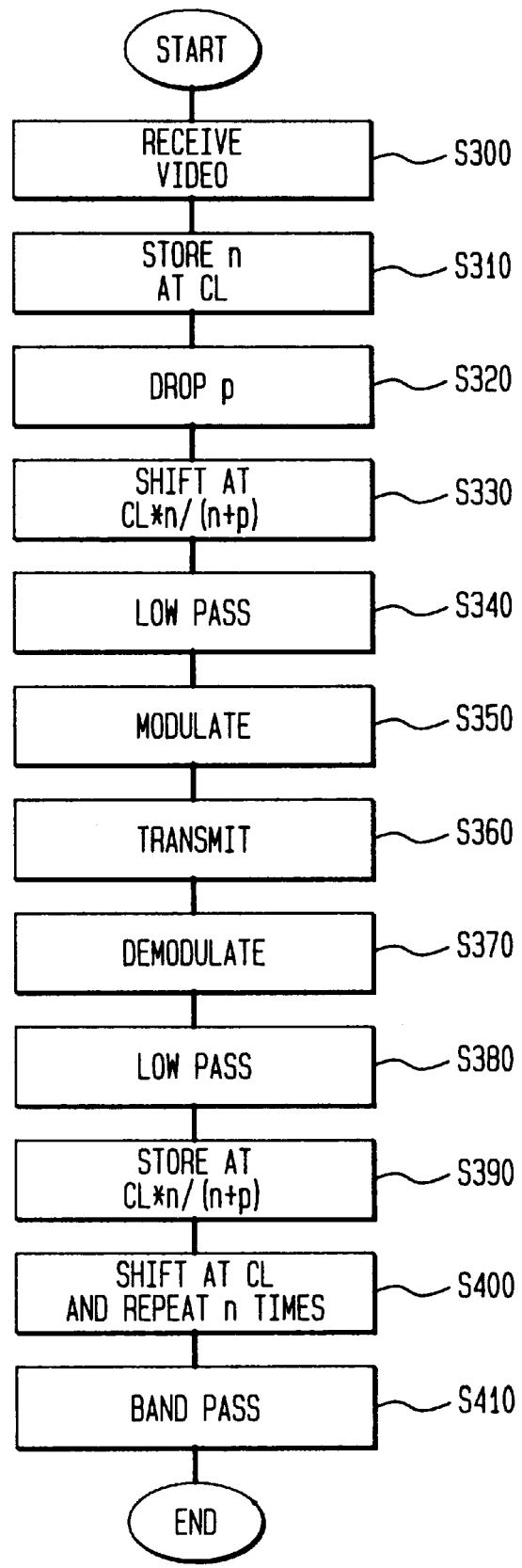
FIG. 7 is a flowchart showing the method of a second embodiment of the invention.

FIG. 7 illustrates the steps for accomplishing compression in the analog CCD embodiment using frequency division multiplexing. In S300, the recorded signals are received by band pass filter 4150 and selected frequencies are passed through. In S310, a first selected number N of fields is stored in CCD 4750 at a selected clock frequency. In S320, a second selected number P of fields is dropped. Subsequently, in S330, the fields are shifted out of CCD 4750 at a frequency equal to the selected clock frequency CL times the ratio of the first selected number N to the sum of the first selected number N and second selected number P. In S340, low pass filter 4400 passes a selected bandwidth which is now proportionately lower than the original analog signal.

The signals are received at modulator 4450 in S350 and are modulated. In S360, these signals are transmitted to the receiving device 1000.

In S370, the signals are received by receiving device 1000 and demodulated by demodulator 1150. The signals are transmitted through low pass filter 1160 in S380 for storage in CCD 1300 at S390. The signals are stored at the selected clock frequency multiplied by the predetermined ratio and are shifted out at S400 at the selected clock frequency. Each field stored in CCD 1300 is shifted out multiple times at the selected clock frequency, said multiple being set as the sum of first and second numbers (N+P) divided by the first number (N). Finally, in S410, the signals are sent through bandpass filter 1350.

D. Analog Video Compression in TDM Mode

Analog video compression in TDM mode uses the identical apparatus to that used in FDM mode. Therefore, the description of the apparatus will be omitted.

Figure 9:
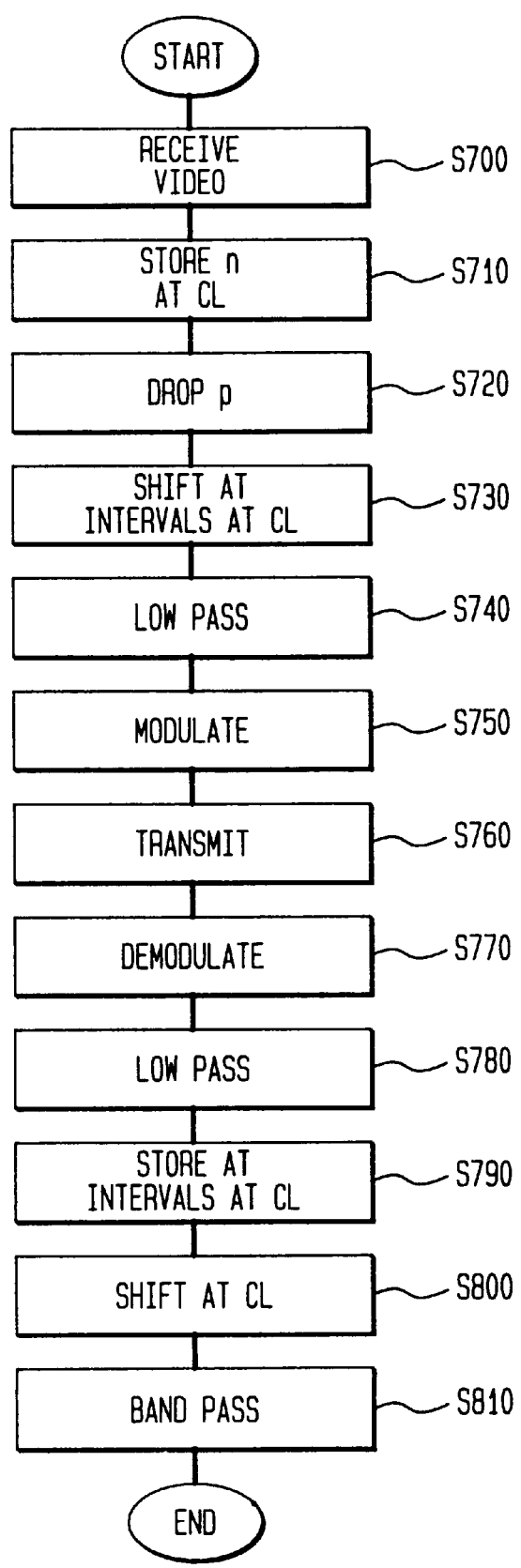
FIG. 9 is a flow chart illustrating the method of a fourth embodiment of the invention.

FIG. 9 illustrates the steps in the analog time division multiplexing embodiment. In S700, composite video is sent to band pass filter 4150. In S710, a selected number N of fields is transmitted to CCD 4750 at a selected clock frequency and is stored. In S720, a second selected number P of fields is dropped. In S730, the stored fields are shifted out of CCD 4750 at a frequency equal to the selected clock frequency but only during selected intervals. The selected intervals correspond to the time T that it takes to transmit the N+P fields at the selected clock frequency times the ratio of N to the sum of N+P. Accordingly, CCD 4750 does not shift the data during a period of time equivalent to T multiplied by the ratio of P to N+P. In S740, the data is shifted out to low pass filter 4400, which passes selected frequencies. The signals are received by modulator 4450 in S750. In S760, the signals are transmitted to the appropriate receiving device 1000.

Upon receipt, the signals are demodulated in S770 and sent through low pass filter 1160 in S780. In S790, the signals from a particular compressed source, are stored in CCD 1300 at selected intervals having a duration of $$T\left(\frac{n}{n+p}\right)$$

as described above. Transmission occurs from other compressed sources for the duration of $$T\left(\frac{p}{n+p}\right).$$

In S800, the data is shifted repeatedly at the selected clock frequency CL. Finally, the data is sent through bandpass filter 1350 in S801.

The alternative embodiments of the invention have differing advantages and disadvantages. The TDM mode that employs time sharing techniques has the advantage that it can successfully employ standard circuit components for its filter and modulators since it uses the standard 6 MHZ channel bandwidth. However, the TDM mode has the disadvantage of requiring precise timing alignment between transmissions. The FDM mode uses nonstandard filters and modulators, but is easier to implement because it does not require precise times alignment control. Accordingly, the selected embodiment will depend on the particular application and available equipment.

Because the invention involves dropping of video information, it is particularly useful for situations in which relatively little motion is reflected in the video signal (such as video telephony) and for networks in which the signals are already intended to be compressed elsewhere in the network, so that no additional information will be lost. Field dropping cuts some of the same information that would be lost in compression in the network. Therefore, limited loss in picture quality occurs.

FIG. 10(a) and 10(b) compare the standard signal to the compressed video signal. FIG. 10(a) illustrates the standard signal and FIG. 10(b) illustrates the bandwidth savings achieved by the compressed video signal.

FIG. 10(c) illustrates a preferred embodiment of the FDM mode in the analog environment. A 4:1 compression ratio is disclosed. Accordingly, only one out of four consecutive fields is captured and stored. The NTSC field is captured through a sampling clock derived from the NTSC source. The sampling clock is obtained from the color burst portion of the NTSC signal and its color-subcarrier frequency is tripled by a phase locked loop (PLL) circuit. The captured NTSC field is placed into a RAM and the content of the RAM is read out at ¼ of the original sampling frequency and is subsequently transmitted onto a wide band network. Although not illustrated in FIG. 10, the bandwidth reduced video field is captured by the decompressor such as A/D convertor 125, data retention device 130 and D/A convertor 135 illustrated in FIG. 3. FIG. 11(a) illustrates the standard video signal and FIG. 11(b) illustrates transmission interval T2 and non-transmission intervals T1, T3, and T4.

FIG. 11(c) illustrates a preferred embodiment of the TDM mode in the analog environment. Again, as shown in the figure, only one out of four fields is retained. Accordingly, data is transmitted only at specified intervals having a duration equal to the time it took to transmit only ¼ of the data. Three fourths of the time, no data will be transmitted from this source.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A method for compressing video data from a video source located at a first node and for first transmission to a second node in order to enable second transmission from additional video sources to the second node, the second transmission being separate from the first transmission, the method comprising:

at the first node, sequentially storing a first number of fields N at a selected rate and dropping a second number of fields P to achieve a compression ratio of (P+N):N in order to enable transmission from the additional video sources to the second node; and converting the video signals from analog to digital prior to storing in a digital memory and converting the video data from digital to analog upon transferring the data for transmission of the first number of fields to the second node without transmitting the second number of fields to the second node.

2. The method of claim 1, wherein the video source is able to transmit information using a reduced bandwidth.

3. The method of claim 1, further comprising sharing an original frequency bandwidth with at least one of the additional video sources.

4. A method for compressing video data from a video source located at a first node and for first transmission to a second node in order to enable second transmission from additional video sources to the second node, the second transmission being separate from the first transmission, the method comprising:

at the first node, sequentially storing a first number of fields N at a selected rate and dropping a second number of fields P to achieve a compression ratio of (P+N):N in order to enable transmission from the additional video sources to the second node, wherein the storing step includes storing the data in an analog charge coupled device and transferring data for transmission of the first number of fields by shifting stored charges within the analog charge coupled device for transmission of the first number of fields to the second node without transmitting the second number of fields to the second node.

5. The method of claim 1, further comprising transferring the stored fields out of storage at a reduced rate, wherein the reduced rate is equal to the selected rate multiplied by N/(P+N), in order to decrease an original frequency bandwidth used for transmission by a factor of substantially (P+N)/N.

6. The method of claim 1, comprising transferring the stored fields out of storage at the selected rate during intervals having a duration of T(N/(N+P)) and sequentially halting transmission for a non-transmission interval having a duration of T(P/(N+P)), where T is equal to the time necessary to transmit N+P fields at the selected rate.

7. The method of claim 6, wherein the additional video sources transmit during the non-transmission intervals.

8. The method of claim 6, wherein N is equal to one and P is greater than or equal to one.

9. A method for compressing video data from a video source in order to enable transmission from additional video sources, the method comprising:

sequentially storing a first number of fields N at a selected rate as compressed video data and dropping a second number of fields P to achieve a compression ratio of (P+N):N in order to enable transmission from the additional video sources;

transmitting the compressed video data to a receiving device;

inserting a V-SYNC in place of ½ line of each field in order to eliminate color phase discontinuity; and playing back the stored fields.

10. A method for compressing video data from a video source in order to enable transmission from additional video sources, the method comprising:

sequentially storing a first number of fields N at a selected rate to form compressed video data and dropping a second number of fields P to achieve a compression ratio of (P+N):N in order to enable transmission from the additional video sources; and decompressing the compressed video data, the decompressing comprising:
receiving the N fields;
storing the N fields; and
playing the N fields back at N+P times the selected rate.

11. The method of claim 10, wherein decompressing is performed at one of a head end and a central office.

12. The method of claim 10, wherein decompressing is performed at one of a network interface unit and CPE.

13. The method of claim 10, further comprising converting the video signals from analog to digital prior to storing in a digital memory and converting the video data from digital to analog upon transferring the data.

14. The method of claim 10, wherein the storing step includes storing the data in an analog charge coupled device and the transferring step comprises shifting stored charges within the analog charge coupled device.

15. The method of claim 10, wherein compressed information is received in multiple frequency bands, with each field stored at a rate of N/(N+P) times the selected rate.

16. The method of claim 10, wherein compressed information is received in multiple time slots in a single channel and is stored at the selected rate.

17. The method of claim 4, further comprising transferring the stored fields out of storage at a reduced rate, wherein the reduced rate is equal to the selected rate multiplied by N/(P+N), in order to decrease an original frequency bandwidth used for transmission by a factor of substantially (P+N)/N.

18. The method of claim 4, further comprising transferring the stored fields out of storage at the selected rate during intervals having a duration of T(N/(N+P)) and sequentially halting transmission for a non-transmission interval having a duration of T(P/(N+P)), where T is equal to the time necessary to transmit N+P fields at the selected rate.

19. A method for compressing video data transmitted by a first transmission from a video source in order to enable second transmission from additional video sources, the second transmission being separate from the first transmission, the method comprising:

sequentially storing a first number of fields N at a selected rate and dropping a second number of fields P to achieve a compression ratio of (P+N):N in order to enable transmission from the additional video sources; and transferring the stored fields of storage at a reduced rate, wherein the reduced rate is equal to the selected rate multiplied by N/(P+N), in order to decrease an original frequency bandwidth used for transmission by a factor of substantially (P+N)/N.

* * * * *